Sept. 24, 1963  D. L. CALKINS ET AL  3,104,770
BOAT TRAILER

Filed July 25, 1960  4 Sheets-Sheet 1

INVENTOR.
Dwight L. Calkins
Oscar C. Calkins
Morris W. Guyer
By. Buckwell
Atty.

Sept. 24, 1963     D. L. CALKINS ET AL     3,104,770
BOAT TRAILER
Filed July 25, 1960                                                      4 Sheets-Sheet 2
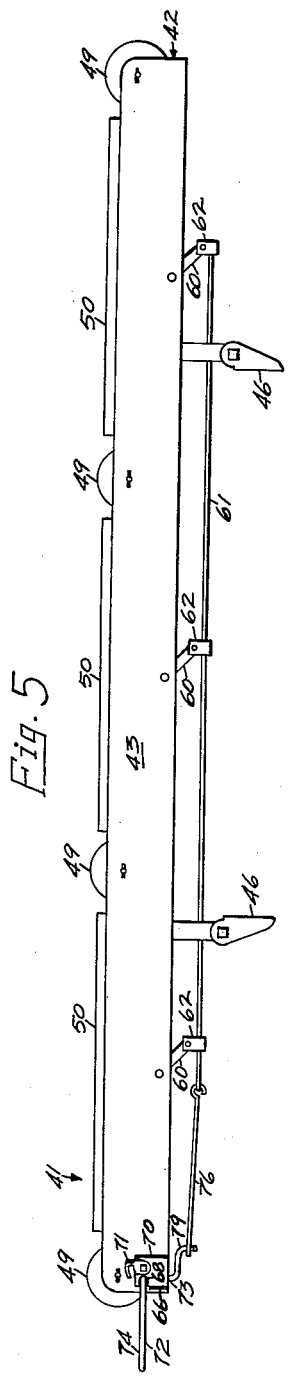
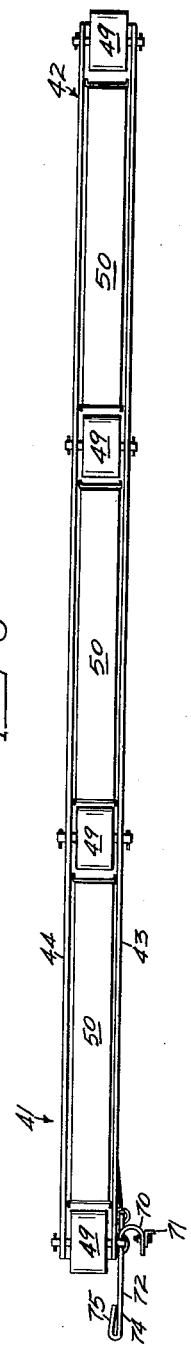
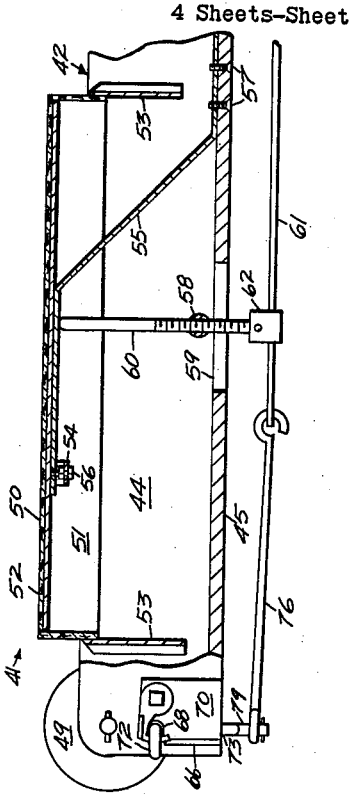
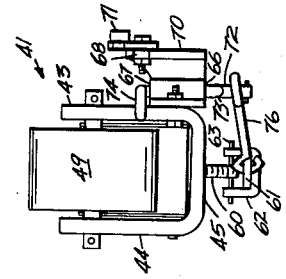
INVENTOR.
Dwight L. Calkins
Oscar C. Calkins
Morris W. Guyer
By.
Atty.

Sept. 24, 1963  D. L. CALKINS ET AL  3,104,770
BOAT TRAILER
Filed July 25, 1960  4 Sheets-Sheet 3
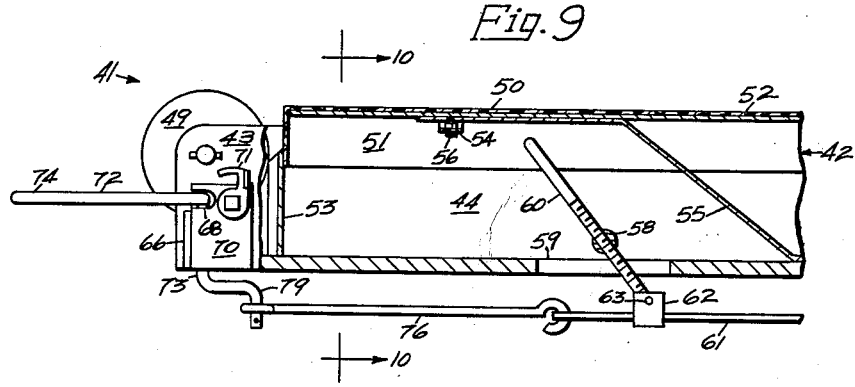
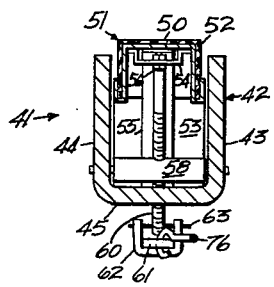
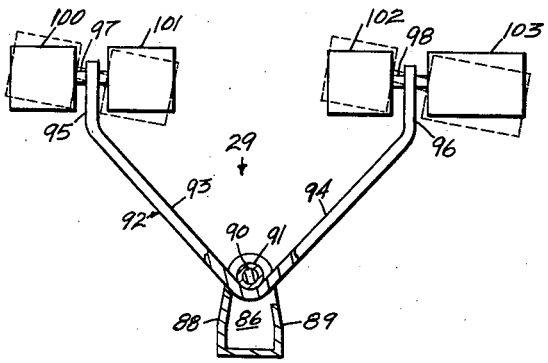
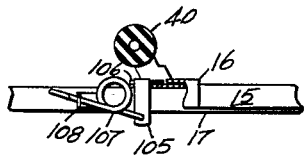
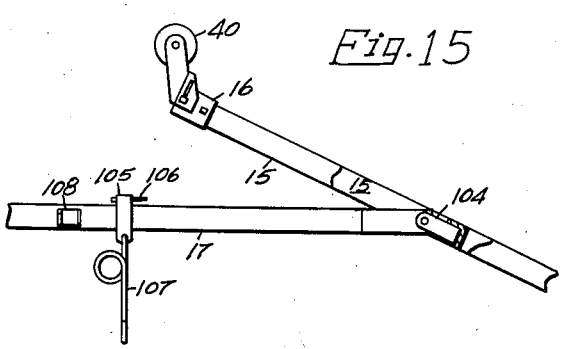
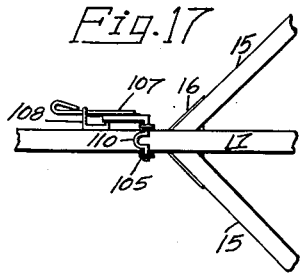
INVENTOR.
Dwight L. Calkins
Oscar C. Calkins
Morris W. Guyer
By
Atty.

Sept. 24, 1963
D. L. CALKINS ET AL
3,104,770
BOAT TRAILER
Filed July 25, 1960
4 Sheets-Sheet 4
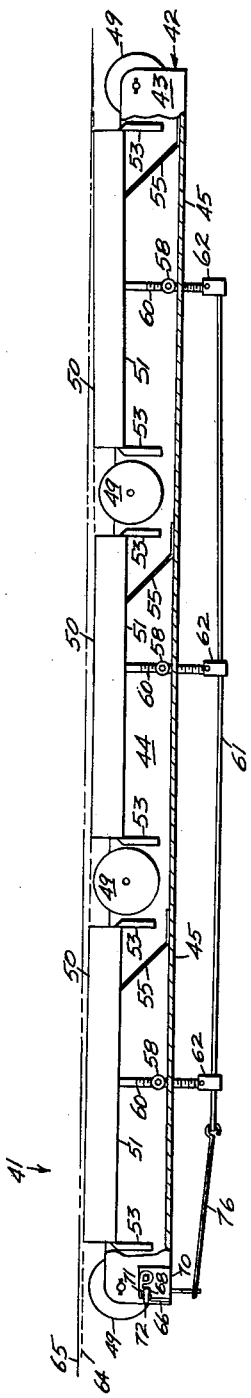
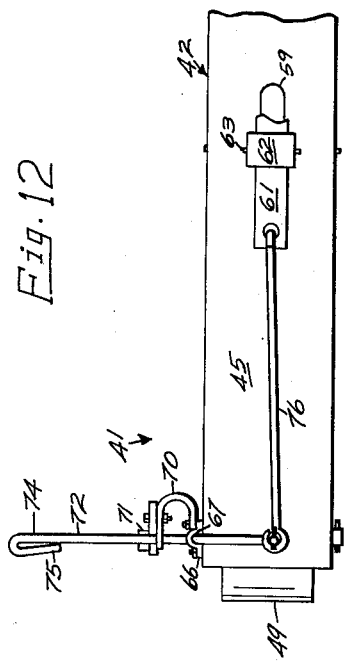
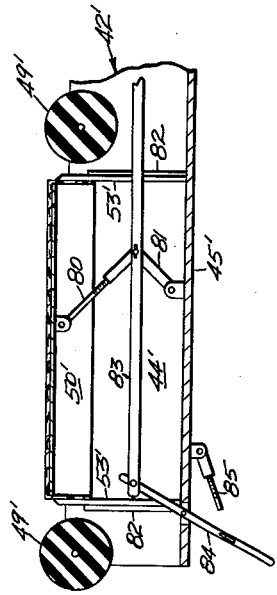
INVENTOR.
Dwight L. Calkins
Oscar C. Calkins
Morris W. Guyer
By. *Gruhlwells*
Atty.

United States Patent Office 3,104,770
Patented Sept. 24, 1963

3,104,770
BOAT TRAILER
Dwight L. Calkins, Oscar C. Calkins, and Morris W. Guyer, all of Spokane, Wash., assignors to Calkins Sale Co., Spokane, Wash.
Filed July 25, 1960, Ser. No. 45,067
7 Claims. (Cl. 214—84)

This invention relates to an improved boat trailer.

The present popularity of boating, coupled with the rising costs of moorage, has given rise to a prevalent practice of utilizing mobile trailers for both transportation and storage of private boats. Such trailers are now used to carry large boats, often with one or more heavy outboard motors attached to the boat transom. Most trailers use spaced rollers to both guide the boat onto the trailer and to support the boat hull during transporting and storage. This has been found to be disadvantageous in the case of hulls made of light material such as plywood or fibreglass, which tend to be distorted due to the high localized stresses at the portions of the hull contacted by the rollers. Often, after storage over a winter, this "set" or bulge will be permanent, which seriously disfigures the boat.

It is an object of this invention to prevent such distortion by lifting the boat from guide rollers onto padded bunks having a wide pressure area so as to eliminate high local stresses on weak portions of the boat hull. This is accomplished by spacing padded bunks adjacent to the side rollers of a trailer, the bunks being adjustable to fit the hull contour of the boat carried on the trailer and being vertically movable as a unit to lift the boat from the rollers after loading. The bunks serve a secondary purpose of providing frictional contact with the boat hull so as to prevent it from moving during transit.

It is another object of this invention to provide ease in loading and unloading a boat by providing a hinged frame, plus a novel roller arrangement at the rear of the trailer. This roller arrangement utilizes tiltable rollers and support arms, and is biased so as to always be in position for the boat. It provides an automatic adjustment to the hull contour passing over the rollers. It is also located directly under the boat transom after loading, which provides strong support for the motor weight normally exerted by the transom.

These objects and further objects will be more evident to the reader after studying the following description and drawings which illustrate a trailer built according to the concepts of the invention. This particular trailer structure is merely exemplary of the many possibilities opened by the invention. It is not intended to limit the invention which is accurately defined in the annexed claims.

In the drawings:

FIGURE 5 is an enlarged side view of a roller and bunk apparatus;

FIGURE 6 is a top view of the apparatus seen in FIGURE 5;

FIGURE 7 is an enlarged end view taken from the left hand end of FIGURE 5;

FIGURE 8 is a fragmentary enlarged side view of the left hand end of the bunk and roller apparatus of FIGURE 5, the bunk being sectioned through its center and being in its raised position;

FIGURE 9 is a view similar to FIGURE 8, with the bunk in its lowered position;

FIGURE 10 is a cross-section view of a bunk taken substantially along line 10—10 in FIGURE 9;

FIGURE 11 is a side view of a roller and bunk assembly with a portion of one side wall of the support broken away to show the bunks under loading;

FIGURE 12 is an enlarged bottom view of the left hand end of a support as seen in FIGURE 8;

FIGURE 13 is a view similar to FIGURE 8, showing a modified form of the lifting mechanism;

FIGURE 14 is a view of the transom roller assembly, the mounting bracket being shown in section;

FIGURE 15 is an enlarged side view of the tongue and hinge area, portions of the frame and tongue being broken away;

FIGURE 16 is a side view of the hinge locking mechanism, with portions shown in section, and FIGURE 17 is a bottom view of the hinge locking mechanism shown in FIGURE 16.

Figure 1:
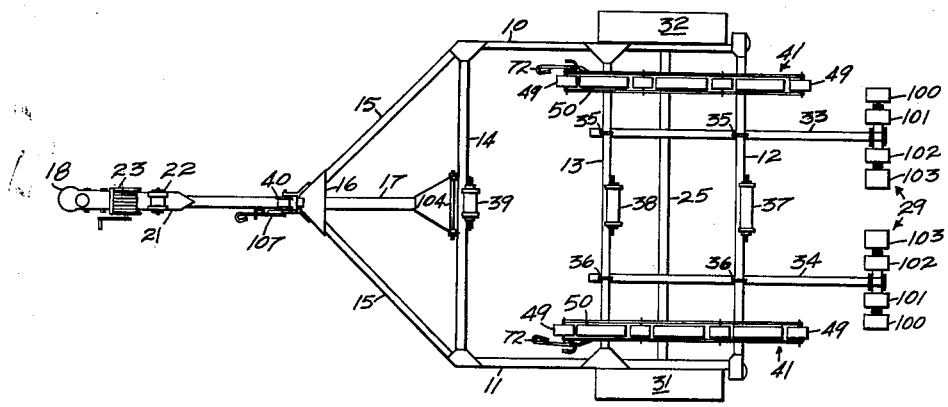
FIGURE 1 is a top view of the boat trailer.
Figure 2:
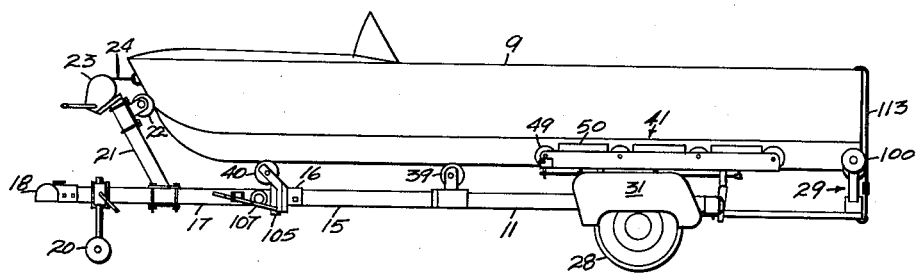
FIGURE 2 is a side view of the trailer with a boat in place.
Figure 3:
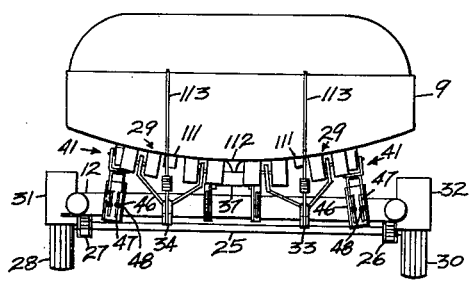
FIGURE 3 is an end view of the loaded trailer taken from the right hand end of FIGURE 2.

Referring to the drawings, and to FIGURES 1-3 in particular, the general scheme of the trailer will be described. The trailer is formed with a longitudinal frame consisting of suitable side members 10, 11, a rear cross member 12, a central cross member 13 and a front cross member 14, all of which are rigidly secured to provide a strong frame assembly. Extending forwardly from the corners of side elements 10, 11 and the front cross member 14 are two diagonal braces 15, which are joined at their forward ends by means of a triangular connector 16. Hinged to the front cross member 14 is a tongue 17 having a hitch 18 at the forward end thereof. Also mounted near the forward end of tongue 17 is a third wheel 20 which is adjustable in height, and a fixed abutment 21 having a bow roller 22 rotatably journalled on its upper rear surface and a winch 23 on its forward surface. Winch 23 is used to pull a cable 24 attached to the bow of the boat to haul the boat onto the trailer and secure it against roller 22 in the usual fashion.

The frame is carried by an axle 25 suspended by springs 26, 27 connected to side members 10, 11 respectively. Ground engaging wheels 28, and 30 are mounted on axle 25 in normal fashion and are covered by fenders 31, 32 respectively.

Two inner longitudinal frame members 33, 34 are fixed to the rear and central cross members 12 and 13 by means of adjustable straps 35, 36 respectively. Each member 33, 34 has mounted thereon a transom roller assembly 29. Central keel rollers 37, 38, 39, and 40 are adjustably secured to the rear cross member 12, central cross member 13, front cross member 14 and triangular connector 16 respectively. In addition a roller and bunk assembly 41 is adjustably secured to members 12 and 13 on either side of the trailer.

The roller and bunk assembly 41 is shown in detail in FIGURES 5-12 inclusive. It consists of a longitudinal rigid support 42 formed in a channel configuration having vertical sides 43, 44 and a closed bottom 45. The support 42 is secured to the frame by means of brackets 46 which are provided with long slots 47. Slots 47 receive bolts 48 which are secured through apertures in cross members 12 and 13. Slots 47 allow for adjustment of the vertical height and angular position of support 42, which can be locked in place by means of bolts 48.

Mounted along the support 42 are a plurality of rollers 49 which are spaced longitudinally and are bearingly mounted between sides 43, 44 so as to be free to rotate. Interposed between each pair of adjacent rollers 49 is a movable bunk 50 which is comprised of an inverted channel 51. The lower ends of the channel legs are turned up to clamp a pad 52 formed of carpeting, felt, burlap or other suitable padding material. Pad 52 extends across the ends of channel 51 and completely covers the upper portion of bunk 50. Each end of bunk 50 is provided with a narrow vertical channel 53 connected to channel 51. Channel 53 serves as a vertical guide and as legs to limit downward motion of the bunk 50. The undersurface of channel 51 has a strap 54 fixed to it, which receives the top end of a bent leaf spring 55. Spring 55 is secured by a set screw 56. The spring 55 extends diagonally downward and is fastened at its lower end to the inner surface of the bottom 45 of support 42 by means of screws 57. Spring 55 serves to define the upward path of bunk 50 and biases the bunk 50 to its lower position. It also serves as a bearing for the lifting mechanism.

The lifting mechanism for each bunk consists of a shaft 58 which is rotatably mounted between vertical sides 43, 44 of support 42 beneath spring 55. A threaded aperture is cut through shaft 58 at its center and perpendicular to the axis of shaft 58. Threadably secured through this aperture is a cross shaft 60 having a smooth top end and an apertured lower end which extends through a slot 59 in bottom 45. The top end of shaft 60 is adapted to bear against spring 55 to thereby raise bunk 50 when the shaft 60 is pivoted about the axis of shaft 58.

A common actuating apparatus is provided to lift the bunks 50 of each support 42 in a simultaneous fashion. This consists basically of a flat spring metal strap 61 to which are secured short channels 62 in proximity to the lower end of each shaft 60. A pin 63 extends through the apertured lower end of the shaft 60 and is pivotally held by channel 62. Thus it can be seen that reciprocation of strap 61 will result in vertical movement of bunks 50 depending upon the relationship of shaft 60 and bunk 50. The pin 63 is preferably a type which can easily be unfastened and locked again in place. It must be removed for adjustment of shaft 60 by turning shaft 60 to advance its threaded engagement with shaft 58. This results in a change in the moment arm between strap 61 and shaft 60 to thereby vary the movement of bunk 50 so as to better fit the hull contour. This is illustrated in FIGURE 11 which shows a typical boat contour (line 64) and a comparable level line 65. The uneven distances between the shafts 58 and strap 61 are accommodated by the flexible nature of the spring steel used in strap 61. The threaded shafts 60 therefore allow the operator to custom fit the trailer to a particular boat so as to evenly distribute the bulk of the boat weight among the plurality of bunks 50.

The means by which strap 61 is reciprocated are best seen in FIGURES 7, 8, 9 and 12. Since the lifting motion is to the left, the apparatus is primarily a pulling arrangement toward the left end of the support 42 as seen in these figures. A bracket 66 is attached to the outer surface of side 43. It consists of a vertical bearing 67 and a U-shaped element 70 which has a horizontal aperture 68 cut along its left hand end. Pivoted to element 70 is a hook 71 which closes the open end of aperture 68. A crank 72 is formed with a vertical central portion 73 rotatably journalled in bearing 67. Crank 72 is bent perpendicularly below bearing 67 and again at 79 which is at such a distance as to reach to the center line of bottom 45. The crank 72 is also bent perpendicularly above bearing 67, in an opposite direction to the bend below bearing 67, to form a handle 74 having a closed looped end 75. Handle 74 is adapted to swing about the pivotal portion 73 and fits within the aperture 68, where it can be locked by hook 71.

The lower end of crank 71 is received by a loop at one end of a connecting link 76 which is held on crank 71 by a pin 77. Link 76 is straight, and extends to strap 61 which is connected to it by another closed loop end. Thus it can be seen that pivotal motion of crank 72 will result in reciprocating movement of strap 61.

An alternative form of lifting mechanism is shown in FIGURE 13. In this instance, the support 42', rollers 49' and bunk 50' are identical to those previously described. A toggle arrangement is used to raise and lower the bunks 50'. Each bunk 50' has an ear 78 to which is pivoted an extensible link 80 which may be lengthened or shortened by adjustment of its screw threads. Link 80 is pivoted to a second link 81 which has its opposite end pivoted to the bottom 45' of support 42. The two links 80 and 81 form a toggle mechanism which can lift the bunk 50'. Bunk 50' is guided vertically by means of side guides 82, which bear against the channels 53' of bunk 50'.

The several toggle mechanisms are actuated by reciprocation of a common longitudinal rod 83 which is pivotally connected to the joints of links 80 and 81. The rod 83 is moved by a simple lever 84 pivoted to bottom 45'. A latch 85 is provided to hold the lever 84 so as to support a boat hull on the bunks 50'.

In either form, this invention contemplates the lifting of the boat hull only a slight distance above the rollers 49 or 49'. This maintains a stable formation and requires no extra force, while distributing the boat weight over a relatively wide surface.

Figure 4:
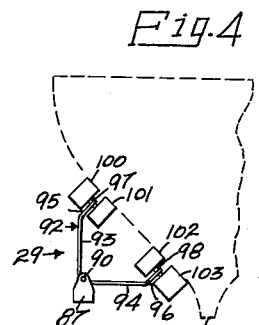
FIGURE 4 is a fragmentary view of one transom roller support assembly during boat loading, the hull contour being shown by a dashed line.

A second important feature of the trailer is shown best in FIGURES 3, 4 and 14. This is the construction details of the transom roller assembly 29 which is provided on each frame member 33, 34. Fixed to the rear end of each member 33, 34 is a bracket having a forward transverse plate 86, a rear transverse plate 87, an outer side plate 88 and an inner side plate 89. Plate 88 is higher than plate 89. A pin 90 is mounted between the plates 86, 87. It has a collar 91 rotatably journalled upon it. Collar 91 is fixed to a bent strap 92 having two legs 93, 94 formed perpendicularly to each other, the collar 91 being secured to strap 92 at the apex of legs 93, 94. The outer ends of legs 93, 94 are bent toward each other to form parallel sections 95, 96 respectively. Each section 95, 96 is provided with an aligned aperture, in which an axle 97, 98 respectively, is loosely mounted so as to be free to pivot as shown in dashed lines in FIGURE 14.

Axle 97 is shown with two identical rollers 100, 101 rotatably mounted upon it on either side of section 95. Axle 98 has a roller 102, of identical structure to rollers 100, 101, rotatably mounted adjacent to roller 101. It also has a larger roller 103 rotatably mounted on it. This roller 103 provides extra weight on the one side of the assembly 37, thereby tending to tilt the assembly inward on the trailer (see FIGURE 4). The plates 88 and 89 serve to limit pivotal movement of strap 92 about pin 90, there being greater allowance for movement of strap 92 toward the center line of the trailer. The purpose of the assembly 29 is to guide and support the boat hull as it is pulled from the water or is being unloaded. The weight of roller 103 serves to always insure the proper attitude of the assembly 29. The rollers 100—103 are loosely mounted so as to accommodate any hull contour. As the boat passes over the rollers 100—103 they will constantly change position until the transom of the boat is directly over them and the boat is locked in place.

The tongue hinge is shown bent in FIGURES 15–17. The tongue 17 is hinged to the front cross-member 14 by means of a long hinge 104. The triangular connector 16 overlaps tongue 17 and is adapted to be locked to the tongue 17 by means of a slidable bracket 105 having a wedged plate 106 extending rearwardly along the top surface of tongue 17. Pivoted to the lower end of bracket 105 is a spring handle 107 which is adapted to be locked in a stop 108 fixed to tongue 17. Tension on the spring handle 107 is provided by a curved area 110 of handle 107 which is formed below tongue 17. Thus it can be seen that bracket 105 may be used to selectively lock connector 16 to tongue 17.

The operation of this trailer should be evident from the above disclosure. A boat 9 is shown in FIGURES 2 and 3 as it appears when fully loaded onto the trailer at a beach or loading ramp, the trailer is first backed into the water and bracket 105 is released to allow the rear end of the trailer to fall backwards to the ground surface. The bow of boat 9 is then attached to the end of cable 24 and winch 23 is utilized to draw the boat over the trailer. The bunks 50 are in their lower position and the two transom roller assemblies 29 are tilted toward one another due to the overbalance of rollers 103. The two assemblies 29 fit the changing hull contour. They provide space between rollers 101 and 102 to receive a double keel if provided on the boat such a keel is designated as 111 in FIGURE 3. The sides of the hull are carried along rollers 49, while the center keel 112 rides along the rollers 37—40. When the boat 9 is sufficiently over the trailer bed, it can easily be tilted forward and bracket 105 may be locked. The boat is then pulled against the roller 22 and winch 23 is locked. The trailer is then pulled from the water. By adjustment of handle 74, the pre-adjusted bunks 50 are raised as two units to lift the weight of the boat from rollers 49. The transom may then be secured to the trailer in the usual fashion by adjustable cables 113. In this manner, the weight of the boat is placed on rollers 100—103, rollers 37—40 and bunks 50. No concentrated pressure is left on any portion of the boat hull which is not reinforced. This prevents all danger of the boat being permanently deformed during storage. The unloading operation is merely the reverse order of the steps just outlined.

Minor modifications may appear to one trained in this field without transversing the scope of this invention. Therefore only the following claims are intended as definitions of the invention.

Having thus described our invention, we claim:

1. In a boat trailer including a mobile frame, a longitudinal pin mounted on said frame, a sleeve rotatably journalled on said pin, a pair of arms secured to said sleeve and positioned perpendicular to the axis of said sleeve and to each other, each of said arms terminating in a plane portion which is parallel to the corresponding portion of the remaining arm, said plane portions being each provided with axially aligned bearing apertures, each arm being provided with a transverse axle loosely mounted through said aperture, each axle having rotatably supported thereon a pair of rollers, the rollers of each pair being located adjacent opposite surfaces of said plane portions, and stop means fixed to said frame adapted to limit pivotal movement of said arms about the axis of said sleeve.

2. The invention as defined in claim 1 wherein one outside roller on one axle is axially longer than each of the remaining three rollers, the excess weight of said one outside roller serving to bias said arms to a pivoted position about said pin.

3. A rear roller apparatus for a boat trailer comprising a mounting bracket adapted to be mounted on a mobile trailer frame at the rear end thereof, a pivot shaft mounted on said bracket in a longitudinal direction relative to the frame, a pair of upwardly diverging arms joined to one another at their lower ends, the lower ends of said arms being pivotally mounted on said shaft, each of said arms being provided with a coaxial aperture adjacent its upper end, the apertures being located axially perpendicular to a plane bisecting the angle between said arms and containing the central axis of said shaft, individual axles loosely mounted in the apertures of said arms, and a pair of rollers rotatably mounted on each of said axles, the rollers of each pair being located adjacent opposite surfaces of said arms.

4. In a boat trailer, an elongated frame, transverse rollers on the frame spaced longitudinally and transversely thereof operable to guide a boat onto and off the frame and to support the boat thereon, and bunks on said frame arranged in spaced apart longitudinal rows adjacent to the rollers, each bunk being individually movable up and down between a position below the level of the adjacent roller and a position above the level of the adjacent roller determined by the boat contour, individual adjustable lifting means provided on said frame for each bunk operable to raise it against the boat, comprising a transverse shaft rotatably mounted on said frame below each bunk, a cross shaft joined perpendicularly to each transverse shaft, and a common actuating means connected to all of the lifting means in a row of bunks operable to simultaneously move the lifting means of that row, said actuating means comprising a longitudinal member pivotally joined to the lower end of each cross-shaft in a row of bunks, a handle operatively connected to said longitudinal member adapted to reciprocate said longitudinal member, said cross-shaft including a top end adapted to abut the lower surface of its respective bunk to thereby move said bunk responsive to reciprocation of said longitudinal member by said handle.

5. In a boat trailer, an elongated frame, transverse rollers on the frame spaced longitudinally and transversely thereof operable to guide a boat onto and off the frame and to support the boat thereon, and bunks on said frame arranged in spaced apart longitudinal rows adjacent to the rollers, each bunk being individually movable up and down between a position below the level of the adjacent roller and a position above the level of the adjacent roller determined by the boat contour, each bunk being mounted on said frame by means of a diagonal leaf spring which is fixed at its upper end to said bunk to form a bearing surface, the lower end of said spring being fixed to said frame to thereby urge the bunk downward, individual adjustable lifting means provided on said frame for each bunk operable to raise it against the boat, said individual lifting means comprising a transverse shaft rotatably mounted on said frame below each bearing surface, said transverse shaft being provided with a central threaded aperture directed perpendicular to the shaft axis, a cross-shaft threadably engaged within said aperture and extending at both of its ends beyond said transverse shaft the top end of said cross-shaft being formed as a smooth surface adapted to slidably engage the corresponding bearing surface, and a common actuating means connected to all of the lifting means in a row of bunks operable to simultaneously move the lifting means of that row, said actuating means comprising a longitudinal flat spring pivotally secured to the bottom ends of the cross-shaft associated with a row of bunks, a handle operatively connected to said flat spring adapted to reciprocate said flat spring in a longitudinal direction to thereby raise and lower the row of bunks, and locking means engageable with said handle adapted to maintain said bunks in their raised positions.

6. In a boat trailer, an elongated frame, transverse rollers on the frame spaced longitudinally and transversely thereof operable to guide the boat onto and off the frame and to support the boat thereon, and bunks on said frame arranged in spaced apart longitudinal rows adjacent to the rollers, each bunk being individually movable up and down between a position below the level of the adjacent roller and a position above the level of the adjacent roller determined by the boat contour, individual adjustable lifting means provided on said frame for each bunk operable to raise it against the boat, said lifting means comprising a first link pivoted at its lower end to said frame about a transverse axis below the bunk, a second longitudinally extensible link pivoted at its upper end to the bunk about a parallel transverse axis, the lower end of said second link and the upper end of said first link being pivotally connected for movement about a third parallel transverse axis, and a common actuating means connected to all of the lifting means in a row of bunks operable to simultaneously move the lifting means of that row, said common actuating means comprising a longitudinal bar operatively connected to each of the pivotal connections between said first and second links in one row of bunks, and means connected to said longitudinal bar adapted to reciprocate said bar along its length to thereby raise or lower the connected bunks.

7. In a boat trailer: an elongated frame, transversely spaced longitudinal rows of rollers rotatably mounted on said frame about fixed transverse axes adapted to guide and support a boat hull for motion relative to said frame, a plurality of bunks on said frame arranged in longitudinal rows adjacent said rollers, said bunks being mounted on said frame for elevational movement relative to the rollers between a lowered position wherein the upper surface of each bunk is located at an elevation below the upper roller surfaces and a raised position wherein the upper surface of each bunk is elevated above the upper roller surfaces, individual lifting means mounted on said frame operatively connected with the respective bunks operable to move the bunks between said lowered and raised positions, and common actuating means respectively connected to the lifting means of each bunk in an individual row of bunks adapted selectively to effect simultaneous movement of a row of bunks between said lowered and raised positions, said individual lifting means being adjustable, whereby the elevation of each bunk in its raised position may be varied relative to the remaining bunks.

References Cited in the file of this patent
UNITED STATES PATENTS

| | | |
|---|---|---|
| 2,714,967 | Olsen | Aug. 9, 1955 |
| 2,793,774 | Lovegreen | May 28, 1957 |
| 2,812,080 | Campos | Nov. 5, 1957 |
| 2,816,672 | Facchini | Dec. 17, 1957 |
| 2,835,401 | Byrd | May 20, 1958 |
| 2,840,252 | Weber | June 24, 1958 |
| 2,901,138 | Whalen | Aug. 25, 1959 |
| 2,949,992 | Weinberg | Aug. 23, 1960 |
| 2,957,593 | Evans | Oct. 20, 1960 |
| 2,975,916 | Steber | Mar. 21, 1961 |